F. A. BOEDTCHER & S. I. SCHWARTZ.
WIND SHIELD.
APPLICATION FILED JAN. 22, 1917.

1,295,102.

Patented Feb. 25, 1919.
2 SHEETS—SHEET 1.

Franz A. Boedtcher Inventors
Simon I. Schwartz and
By their Attorney
Jas. H. Griffin

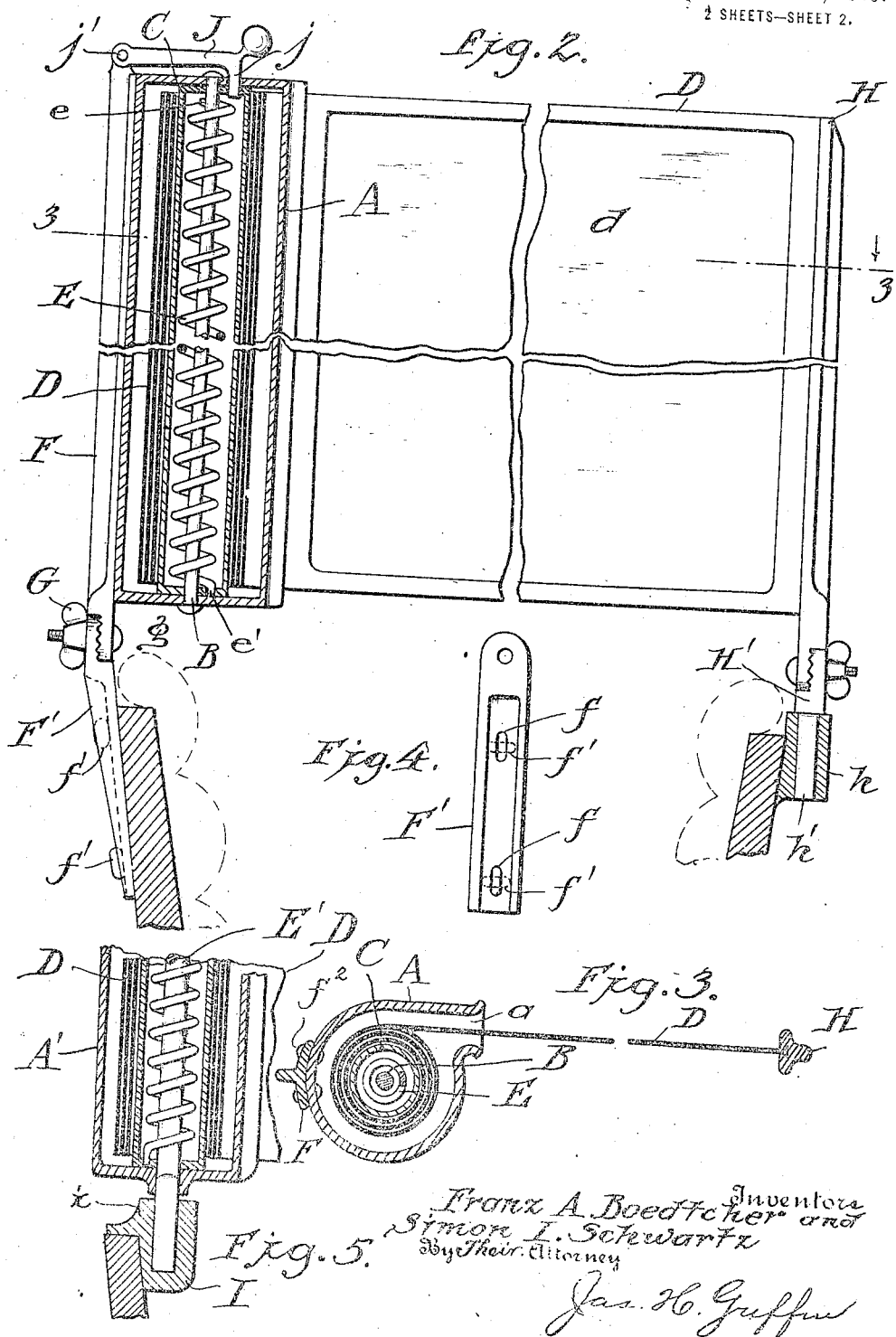

UNITED STATES PATENT OFFICE.

FRANZ A. BOEDTCHER, OF BERGENFIELD, NEW JERSEY, AND SIMON I. SCHWARTZ, OF NEW YORK, N. Y.

WIND-SHIELD.

1,295,102.  Specification of Letters Patent.  Patented Feb. 25, 1919.

Application filed January 22, 1917.  Serial No. 143,604.

*To all whom it may concern:*

Be it known that we, FRANZ A. BOEDTCHER and SIMON I. SCHWARTZ, citizens of the United States, residing in Bergenfield, county of Bergen, and State of New Jersey, and the city of New York, borough of Manhattan, county and State of New York, respectively, have invented a certain new and useful Wind-Shield, of which the following is a specification.

This invention is a wind shield for vehicles, and the object of the invention is to provide a wind shield which, when not in use, may be readily compacted and stored away beneath the seat of an automobile or in any other suitable vacant space about the car. A further object of the invention is to provide a device of this character which will be extremely simple in construction, reliable in its operation, and will not be apt to get out of order.

Speaking generally, the invention embodies a wind shield in the form of a flexible web adapted to be normally wound upon a roller mounted at one side of the car. When it is desired to employ the wind shield for the performance of its function, the web is extended transversely of the car and secured to a standard to maintain the web in extended position, whereby it is maintained stretched across the car to protect the occupants seated rearwardly thereof from the rush of air, as the car travels along the road.

The invention embodies many features of advantage and improvements in construction, which will be manifest from the following detailed description read in conjunction with the accompanying drawings.

In the accompanying drawings we have illustrated different practical embodiments of the invention, but the constructions shown therein are to be understood as illustrative, only, and not as defining the limits of the invention.

Fig. 2 is a section on line 2—2 of Fig. 1. In this view, certain parts are shown in central section, in the interest of clearness.

Fig. 3 is a section on line 3—3 of Fig. 2.

Fig. 4 is a face view of an attaching standard of the type which is preferably employed, and Fig. 5 is a view similar to Fig. 2, but illustrating a slightly modified form of mounting for the wind shield.

Figure 1:
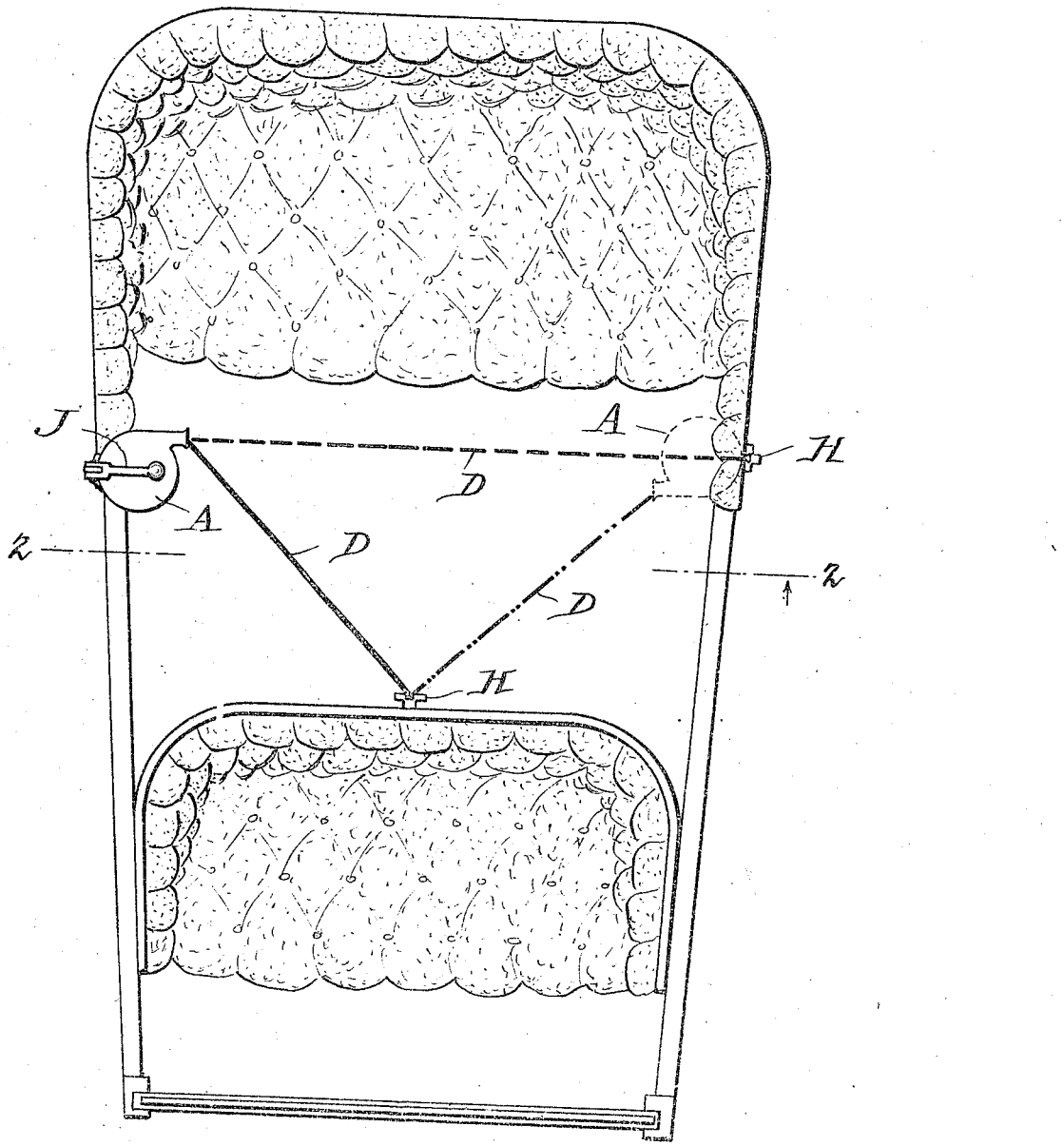
Figure 1 is a plan view of a car body, showing a wind shield, embodying the present invention, in operative position thereon. This figure shows different arrangements of which the wind shield is capable.

Referring to the drawings, A designates a tubular casing provided at one side with a longitudinal slot or opening $a$. In the preferred embodiment of the invention illustrated in Fig. 1, this casing is shown as provided interiorly with a shaft B, extending from end to end of the casing and fixed against movement relative thereto by riveting over the opposite ends of the shaft exteriorly of the casing.

Shaft B serves as the axis of rotation for a tubular roller C, which is mounted interiorly of the casing, and upon which roller is adapted to be wound a flexible web D. Web D may be formed substantially entirely of celluloid, or some other transparent material, but is preferably constructed from a fabric having one or more transparent panels $d$. Web D is normally maintained wound upon roller C by means of a helical spring E which is coiled around shaft B, with its upper end secured to the shaft, as at $e$, and its lower end secured to the roller, as at $e'$. Web D is secured to roller C, and, when in extended position, passes through the outlet slot $a$ of the casing, as shown in Fig. 3.

For the purpose of facilitating the mounting of the roller in such position as to allow of the use of the web as a wind shield, a standard F is affixed to the casing by means of rivets $f^2$. This standard projects below the lower end of the casing and has a foot F′ preferably so formed as to detachably engage with means positioned on an automobile body for the purpose of supporting the roller in substantially upright position.

This means may partake of various forms, but, in the construction of Fig. 1, the form illustrated is that wherein the foot F′ is provided with a plurality of elongated slots $f$, and on the automobile body are mounted two corresponding turn-buttons $f'$. When the turn-buttons are in parallel relation, the foot is adapted to be slipped thereover, so that the turn-buttons pass through slots $f$, whereupon said turn-buttons may be rotated through an angle of ninety degrees, as shown in dotted lines in Fig. 4, wherein they are out of alinement with slots *f* and serve to rigidly secure foot F' to the car body.

Foot F' may be made integral with standard F, if desired, or may be provided with a joint to allow of pivotal movement of the standard relative to the foot. Such a joint is shown in Fig. 1 as embodying a bolt *g*, which binds together, by means of a wing-nut G, the free ends of standard F and foot F' in a half-lap joint. The contacting faces of the joint are radially fluted or serrated so that, when the wing-nut is tightened, the serrations of the coöperating parts interfit with one another and lock the parts against relative pivotal movement. This construction allows of the locking of the standard at various angles of inclination relative to the foot, it being understood that such adjustment may be accomplished by loosening the wing-nut sufficiently to allow of the tilting of the standard, and thereafter tightening the wing-nut to lock the standard at the desired angle of inclination.

When the roller is mounted upon an automobile body in the manner described, or in any other equivalent way, web D is normally wound upon the roller and is almost entirely housed within casing A. When it is desired to employ the web as a wind shield, said web must, necessarily, be withdrawn through the slot in the casing into extended position, and means must be provided for maintaining said web in such position by supporting the free end thereof. This may be accomplished through the employment of a standard substantially identical with the standard employed for supporting the roller in upright position. That is, it may embody a standard provided with a foot pivoted thereto, and having slots adapted to engage with turn-buttons on the automobile body. However, for the purpose of illustration, I have shown the standard H, which supports the free end of web D, as provided with a foot H', differing somewhat in form from the foot F' of standard F, in that it has a different means of attachment to the car body. Foot H' is provided with a squared or polygonal shank *h'*, which fits into a correspondingly shaped socket in a bracket *h*, fixedly secured to the car body. If desired, a set screw may be provided for precluding inadvertent disengagement from the socket. The connection between foot H' and standard H is shown as identical with the connection between standard F and its foot F', so that these two standards may be both tilted to obtain the desired inclination of the wind shield. Web D may be secured to standard H in any suitable manner, either detachably or fixedly, as desired, but it is shown in the drawings as permanently secured to said standard by having its free edge secured in a channel on the inner face of standard H.

It will be understood that the point of attachment of the bracket *h* is so positioned relative to the point of attachment of foot F' that, when the web is supported in the manner specified, to be suspended between the two standards, said web will occupy a position forward of the occupants of the automobile. While a different form of mounting is shown for the free end of the web from that shown for supporting the roller, this is merely for the purpose of illustrating two forms of mounting which may be employed. However, in practice, these two mountings are preferably of the same character, either one kind or the other. Assuming, therefore, that the devices are the same, and that they are mounted at opposite sides of the car body, it will be apparent that the wind shield is capable of various arrangements.

Referring more particularly to Fig. 1, wherein casing A is shown as mounted at one side of the car, it will be apparent that web D may be either stretched halfway across the car and secured in place by a holder at the back of the forward seat, as shown in full lines, or may be stretched directly across the entire width of the car, as shown in dash lines, and secured at the opposite side thereof. Moreover, if desired, casing A may be mounted at the opposite side of the car, as shown in dotted lines, and the web stretched either directly across the car or halfway across the same, and secured at the rear of the forward seat.

By securing the free end of the web to the forward seat in the manner shown, said web will not, in the least, interfere with the occupants entering or leaving the car, and will thus allow of the positioning of the roller directly in front of the rear seat. However, if the web is stretched directly across the car at the front edge of the rear seat, it will be necessary either to collapse the web when the occupants leave the car, or for the occupants to stoop under the shield in leaving the seat. If it is desired to have the web extend directly across the car, and yet not prevent the occupants from leaving the rear seat in the usual manner, the casing may be positioned farther forwardly than shown; *i. e.*, it may be positioned forwardly of the rear doors of the car, and just rearwardly of the front seat. However, this is a matter of taste, and the invention is not limited in this respect, since, if desired, the wind shield might be placed forwardly of the front seat and employed in lieu of the rigid wind shields now in vogue.

As the car on which the wind shield is mounted passes along a roadway, the rush of air will impose considerable pressure upon web D, and, unless the web is maintained taut, it will be apt to sag or bend under the pressure. For this reason, means is provided for holding the web taut. This means is embodied in a latch J, which is pivoted either to the casing or the standard, as at j', and is provided at its free end with a nose j, adapted to extend through an aperture in the top of the casing and also project through a hole in the top of roller C. There is a plurality of these holes in the top of roller C, so that, when the web is extended, one of said holes will come into register with the hole in the top of the casing, whereby the nose of the latch may be dropped through both holes and thereby lock the roller against rotation. The web will thereby be supported rigidly at both of its ends, and will be maintained in a stretched, taut condition, irrespective of the air pressure.

In Fig. 5 of the drawings is illustrated a modified form of mounting the roller. In this form, no standard is necessary, the shaft E' being extended below the bottom of the casing and forming a stem i, which is shaped into polygonal cross-section. Stem i is adapted to fit into a socket formed in a bracket I, mounted on the car body. The polygonal portion i of shaft E' extends upwardly to a sufficient extent to engage with the aperture in the casing through which the shaft passes, and thus casing A', which corresponds to casing A, is mounted on the shaft against rotation. The remainder of the structure is the same as hereinbefore described. In this modified form, however, it will be noted that the roller is mounted in substantially vertical position at all times, and is not adapted for adjustment into inclined relation with the socket, as is the case in the preferred form of the invention.

A marked advantage of the wind shield of this invention is its extreme simplicity, and the fact that, when not in use, it may either be rolled up, or the device, as a whole, may be removed from position upon the car and stored away under the rear seat, or in any other suitable and convenient place about the car. It is, moreover, easy to attach and does not detract from the appearance of the car. In the drawings, it has been necessary, in the interest of clearness, to show some of the parts much larger in proportion than they would ordinarily be in practice. When the device is in place upon a car, in its commercial form, it is neat and esthetic in appearance, and much less bulky than the drawings would lead one to believe.

Having thus fully described the invention, what we claim as new, and desire to secure by Letters Patent, is:

1. An automobile wind shield embodying a roller, a flexible transparent web secured at one of its ends to the roller, a spring associated with the roller for normally causing the winding of the web on the roller, said web being adapted to be unwound from the roller against the tension of the spring, and standards for supporting the roller and the free end of the web in substantially upstanding position when the web is extended, said standards being pivotally mounted with respect to the automobile body whereby said web, when in extended position, may partake of positions in angular relations to the vertical plane.

2. An automobile wind shield embodying a roller, means for mounting the roller in substantially upright position, a flexible web secured at one of its ends to the roller, a spring associated with the roller for normally causing the winding of the web upon the roller, means for maintaining the web, against the tension of the spring, in extended position forwardly of the occupants of the car, and means, coöperating with the roller, for locking it against rotation when the web is in extended position, and means for securing the web, in extended position, in different vertical planes.

In testimony whereof we have signed our names to this specification.

FRANZ A. BOEDTCHER.
SIMON I. SCHWARTZ.